(12) United States Patent
Yamaoka et al.

(10) Patent No.: US 10,435,215 B2
(45) Date of Patent: Oct. 8, 2019

(54) METAL DECORATIVE PRODUCT

(71) Applicant: TOPPAN PRINTING CO., LTD., Tokyo (JP)

(72) Inventors: Keinosuke Yamaoka, Tokyo (JP); Takamitsu Nakabayashi, Tokyo (JP); Rena Kudo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/921,205

(22) Filed: Mar. 14, 2018

(65) Prior Publication Data

US 2018/0201422 A1 Jul. 19, 2018

Related U.S. Application Data

(63) Continuation of application No. PCT/CN2016/100758, filed on Sep. 29, 2016.

(30) Foreign Application Priority Data

Sep. 30, 2015 (CN) .......................... 2015 1 0639290

(51) Int. Cl.
*B65D 65/42* (2006.01)
*B32B 15/08* (2006.01)
(Continued)

(52) U.S. Cl.
CPC ................ *B65D 65/42* (2013.01); *B32B 1/02* (2013.01); *B32B 15/08* (2013.01); *B65D 5/425* (2013.01);
(Continued)

(58) Field of Classification Search
CPC ....... B32B 15/08; B32B 1/02; B65D 2203/08; B65D 65/42; B65D 65/40; B65D 85/00; B65D 5/425; B65D 5/62; B65D 33/004
See application file for complete search history.

(56) References Cited

U.S. PATENT DOCUMENTS

| 4,196,029 A * | 4/1980 | Privas ...................... C23D 5/06 |
| | | 156/89.16 |
| 2008/0061986 A1* | 3/2008 | Ficker ................ G06K 17/0022 |
| | | 340/572.8 |

(Continued)

FOREIGN PATENT DOCUMENTS

| CN | 101052975 A | 10/2007 |
| CN | 101430772 A | 5/2009 |

(Continued)

OTHER PUBLICATIONS

International Searching Authority, "International Search Report," issued in connection with PCT/CN2016/100758, dated Jan. 11, 2017.

(Continued)

*Primary Examiner* — Betelhem Shewareged
(74) *Attorney, Agent, or Firm* — Foley & Lardner LLP (57) ABSTRACT

A metal decorative product has a metallic luster decoration coated packaging on at least one side of a substrate and encloses a part disposed with electromagnetic wave device. The metallic luster decoration coated packaging is formed by coating an ink mixed with metal powder. In the metallic luster decoration coated packaging, the ink is used to make the metal powder and metal powder connection formed by the metal powder insulated and independent from each other.

28 Claims, 5 Drawing Sheets

(51) Int. Cl.
*B32B 1/02* (2006.01)
*B65D 85/00* (2006.01)
*B65D 5/42* (2006.01)
*B65D 5/62* (2006.01)
*B65D 33/00* (2006.01)
*B65D 65/40* (2006.01)

(52) U.S. Cl.
CPC ............. *B65D 5/62* (2013.01); *B65D 33/004* (2013.01); *B65D 65/40* (2013.01); *B65D 85/00* (2013.01); *B65D 2203/08* (2013.01); *B65D 2203/10* (2013.01)

(56) References Cited

U.S. PATENT DOCUMENTS

2009/0096609 A1  4/2009  Huang et al.
2014/0318699 A1*  10/2014  Longinotti-Buitoni ..................... A61B 5/0002 156/247
2018/0140278 A1*  5/2018  Bromberg ............ A61B 8/4494
2018/0201422 A1*  7/2018  Yamaoka ................ B32B 15/08

FOREIGN PATENT DOCUMENTS

CN   101434752 A   5/2009
JP   2015-160664 A   9/2015

OTHER PUBLICATIONS

International Searching Authority, "Written Opinion," issued in connection with International Patent Application No. PCT/CN2016/100758, dated Jan. 11, 2017.

Extended European Search Report issued in the corresponding EP Patent Application Ser. No. 16850371.2, dated Jul. 9, 2019.

* cited by examiner

METAL DECORATIVE PRODUCT

CROSS-REFERENCE TO RELATED PATENT APPLICATIONS

This application is a continuation application filed under 35 U.S.C. § 111(a) claiming benefit under 35 U.S.C. §§ 120 and 365(c) of International Application No. PCT/CN2016/100758, filed on Sep. 29, 2016, which is based upon and claims the benefit of priority of CN 201510639290.9, filed on Sep. 30, 2015, the entireties of which are hereby incorporated by reference.

FIELD

The invention relates to a metal decorative product, and more specifically to a metal decorative product having a metallic luster to be used, for example, for packaging of high-class goods such as wine and cosmetics.

BACKGROUND

For boxes of high-class goods such as wine, cosmetics and the like, and high-class clothing, the design of metallic luster is sometimes used to show the high-class feel of the commodities in those boxes. As a technology for forming metallic luster, paper laminated with metal foil such as aluminum foil, and paper laminated with metal evaporated film such as aluminum evaporated film have been used in the past.

On the other hand, in order to carry out brand protection, tracking and tracing, and theft prevention for such high-class commodities, RFID tags, anti-theft tags and other devices that use electromagnetic waves are needed.

Figure 5:
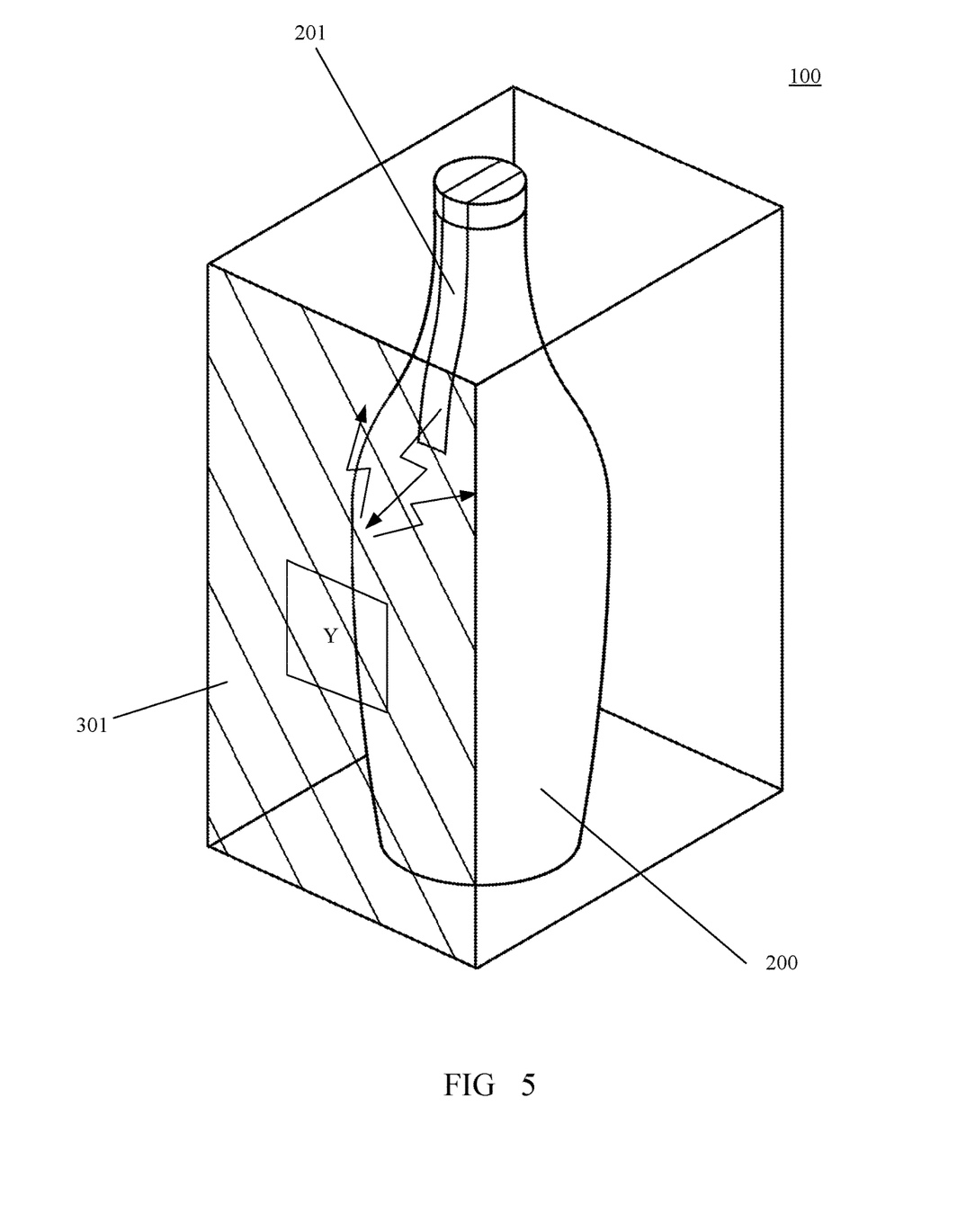
FIG. 5 is a schematic diagram showing the status where a part attached with an electromagnetic wave device is contained in an existing metal decorative product.
Figure 6:
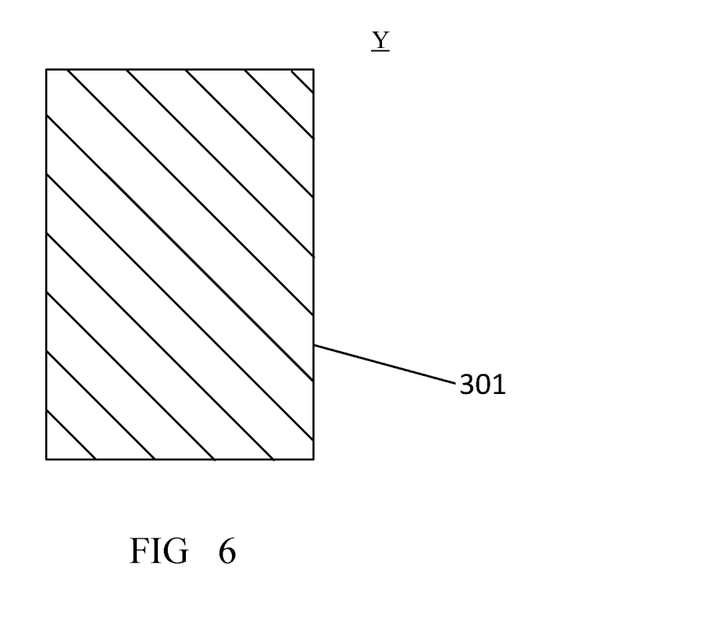
FIG. 6 is an enlarged view of Area Y shown in FIG. 5.
Figure 7:
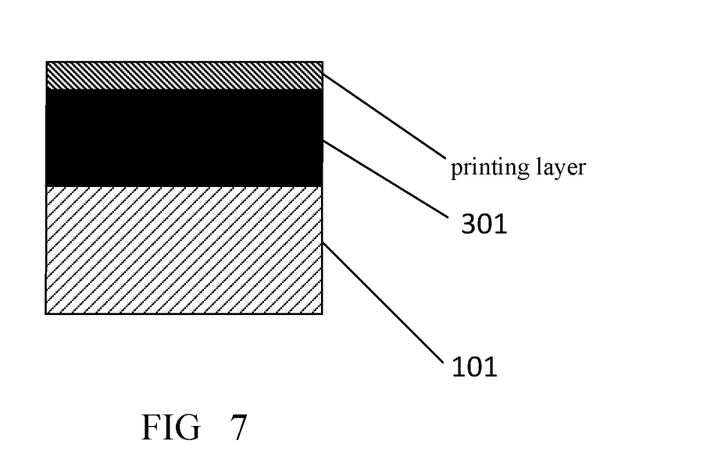
FIG. 7 is a partial sectional view of the existing metal decorative product.

However, since materials using the above-described metal foil or metal evaporated film have the characteristics of reflecting or attenuating electromagnetic waves, these materials may have an adverse effect on the utilization of electromagnetic wave devices. For example, FIG. 5 is a schematic diagram showing the status where the parts pasted with electromagnetic wave device are contained in the existing metal decorative products, FIG. 6 is an enlargement view of Area Y in FIG. 5, and FIG. 7 is a partial sectional view of the existing metal decorative product. FIGS. 5-7 are used to explain the effect on the communication of electromagnetic wave devices. Metal foil is massively formed on the surface of substrate 101 of a wine packaging (which is a metal decorative product 100) as a metallic luster decoration coated packaging 301, and a printing layer is formed on the metallic luster decoration coated packaging 301. Further, a wine bottle is contained in the metal decorative product 100 as a part 200, on which an RFID tag is attached as an electromagnetic wave device 201. As shown by the arrow in FIG. 5, the electromagnetic wave generated by the electromagnetic wave device 201 is reflected by the metallic luster decoration coated packaging 301, so that it cannot be radiated outside the metal decorative product 100. Therefore, it cannot be read with a reader (not illustrated).

In the past, in order to improve the adverse effects caused by the above-described metal foil or metal evaporation, various technologies to avoid forming a conductor surface continuously consisting of metal films were proposed.

For example, the same problem exists in millimeter wave radar equipped on the marking part of cars. As a way to solve this problem, there is a method to form striped evaporation by controlling the evaporation of tin and other metals so as to solve the problem.

Further, in RFID, removal of metal parts (i.e., demetallizing process), by means of etching, etc., is also adopted in products integrated with holograms. Thus, similar strategies are utilized.

By utilizing the above strategies, the continuity of the conductor surface can be destroyed so as to avoid the reflection or attenuation of electromagnetic waves and the like.

SUMMARY OF THE INVENTION

Technical Problem to be Solved by the Present Disclosure

However, the existing special evaporation technology or demetallizing process cannot be easily applied in manufacturing and cause cost increase due to the limitation of evaporated metal materials or the need for special manufacturing equipment.

The present invention is implemented in view of the above-mentioned problems, and its purpose is to provide a metal decorative product that can achieve metallic luster without adversely affecting the performance of electromagnetic wave devices and can be easily manufactured at a more lower cost.

Technical Measures for Solving the Technical Problem

To solve the above-described technical problem, a first aspect of the present disclosure relates to a metal decorative product having a metallic luster decoration coated packaging on at least one surface of the substrate, and enclosing a part equipped with an electromagnetic wave device. The metal decorative product is characterized in that the metallic luster decoration coated packaging is formed by printing ink mixed with metal powder. In the metallic luster decoration coated packaging, the metal powder and the metal powder connection formed by the metal powder are separately insulated and independent with each other by using the ink.

Further, a second aspect of the present disclosure relates to a metal decorative product having a metallic luster decoration coated packaging on at least one surface of the substrate. Electromagnetic wave devices are attached to the surface of the metallic luster decoration packaging. The metal decorative product is characterized in that the metallic luster decoration coated packaging is formed by printing ink mixed with metal powder. In the metallic luster decoration coated packaging, the metal powder and the metal powder connection formed by the metal powder are separately insulated and independent with each other by using the ink.

Further, a third aspect of the present disclosure is characterized in that, in the first or second aspect of the present disclosure, the electrical length made up of the metal powder and the metal powder connection in the metallic luster decorative coated packaging is less than or equal to 5 mm.

Further, a fourth aspect of the present disclosure is characterized in that, in the first or second aspect of the present disclosure, the substrate is a resin film.

Further, a fifth aspect of the present disclosure is characterized in that, in the first or second aspect of the present disclosure, the substrate is a coated paper, on which the metallic luster decoration coated packaging is formed on a coating surface of the coated paper through coating.

Further, a sixth aspect of the present disclosure is characterized in that, in the first or second aspect of the present disclosure, the metal decorative product is a box shaped product.

Further, a seventh aspect of the present disclosure is characterized in that, in the first or second aspect of the present disclosure, the metal decorative product is a bag shaped product.

Further, an eighth aspect of the present disclosure is characterized in that, in the first or second aspect of the present disclosure, the metal decorative product is a laminated product.

Effects of the Disclosure

The metal decorative product of the present disclosure has the following effects: that is, it can achieve metallic luster without adversely affecting the performance of electromagnetic wave devices and can be easily manufactured at a more lower cost.

DETAILED DESCRIPTION OF REPRESENTATIVE EMBODIMENTS

The present invention will be described by description of the following representative embodiments. It will be understood that the following embodiments are intended to be representative of the present invention and that the present invention is not necessarily limited to these representative embodiments.

In the following descriptions, the first embodiment of the present disclosure will be illustrated with reference to FIGS. 1-3.

First Embodiment

Figure 1:
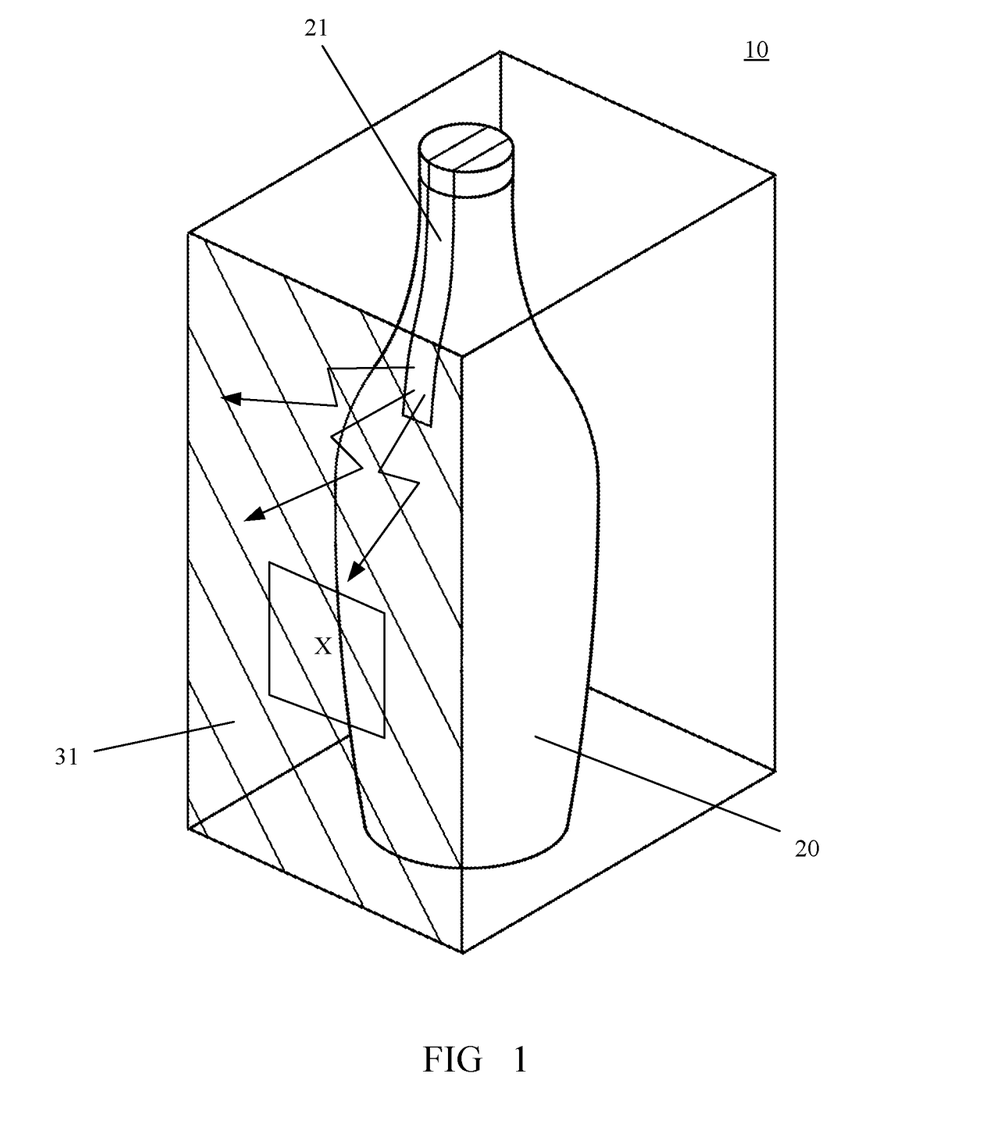
FIG. 1 is a schematic diagram for illustrating the structure of a metal decorative product involved in the first embodiment of the present disclosure.

FIG. 1 is a schematic diagram for illustrating the structure of a metal decorative product involved in the first embodiment of the present disclosure. FIG. 2 is an enlarged view of Area X shown in FIG. 1. FIG. 3 is a partial sectional view of the metal decorative product involved in the first embodiment of the present disclosure. As shown in FIG. 1, a metal decorative product 10 is for example a box for wine or other high-class commodities, and contains therein a part 20 such as a wine bottle that is attached with an electromagnetic wave device 21 such as an RFID tag. Further, as shown in FIG. 3, the metal decorative product 10 is composed of a substrate 11 such as paper. The surface of the substrate 11 has a metallic luster decoration coated packaging 31 formed thereon, a printing layer is formed on the metallic luster decoration coated packaging 31.

Figure 2:
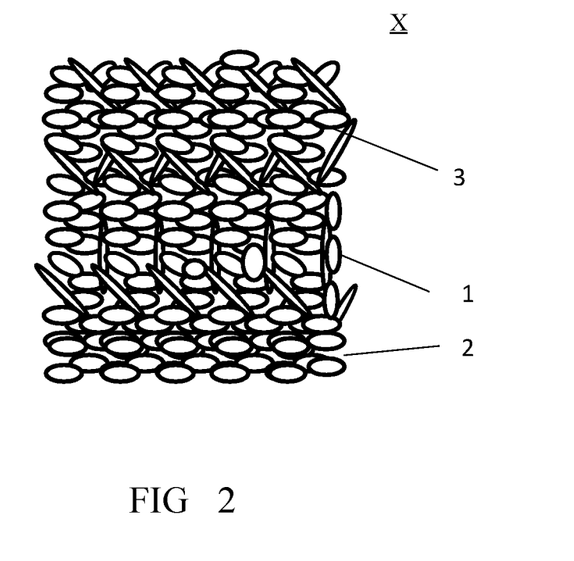
FIG. 2 is an enlarged view of Area X shown in FIG. 1.
Figure 3:
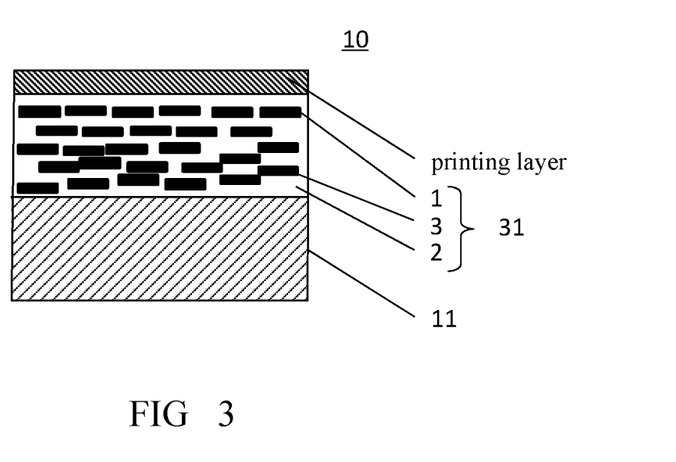
FIG. 3 is a partial sectional view of the metal decorative product involved in the first embodiment of the present disclosure.

FIG. 2 shows the status of the ink that forms the metallic luster decoration coated packaging 31 of the metal decorative product. As shown in FIG. 2, a large amount of metal powder 1 is dispersed in the ink 2 which forms the metallic luster decoration coated packaging 31, and the metal powder 1 is arranged in a tightly dense state. However, since there exists a large amount of insulating ink 2 in a state that covers the surface of the metal powder 1, the insulation between metal powders 1 can be basically ensured.

Also, as shown in FIG. 2, there is situation where a portion of the metal powders tightly contact with each other to form a metal powder connection 3. In the past, such connection is actively used to further connect the metal powders 1 and the metal powder connections 3 so as to form conductive ink, and the conductive ink is printed to form a conductive loop. In contrast, the present disclosure tries to avoid this connection state and uses the ink 2 to make the metal powders 1 and the metal powder connections 3 separately insulated and independent with each other.

With the above-described structure a metallic luster can be achieved, and electromagnetic waves generated by the electromagnetic wave device 21 are allowed to pass through the metallic luster decoration coated packaging 31 and radiate outside the metal decorative product 10 as shown by the arrow in FIG. 1 so as to be read by using a reader (not shown).

Further, in order to more efficiently allow electromagnetic waves generated by the electromagnetic wave device 21 to pass through, from the point of view regarding electrical performance, the metallic luster decoration coated packaging 31 formed by ink mixed with metal powder 1 and metal powder connection 3 made of metal powder 1 needs to separately and independently formed in a status where the electrical length is very short. As a condition for the above-described electrical length, for example in the case where the electromagnetic wave device 21 is a radio wave device, it is required that the electrical length of the metal powder 1 and the metal powder connection 3 formed by the metal powder 1 shall be shorter enough than that of the radio wave device. Further, in the case where the electromagnetic wave device 21 is a magnetic device, it is required that the physical length of the metal powder 1 and the metal powder connection 3 formed therefrom shall be very short. Therefore, in any case, the electrical length of the metal powder 1 and the metal powder connection 3 formed by the metal powder 1 is preferably less than or equal to 5 mm.

Below, a comparison between the metal decorative product illustrated in embodiments of the present disclosure and an existing product as a comparison example is described.

First of all, smoothness of the substrate surface shall be ensured to have metallic luster. Therefore, one side of a paperboard is coated to form a coating so as to form a coated paper. The paperboard, which is the substrate, is about 80 g/m²~300 g/m². A coating surface of the above-described coated paper, which has a coating on one side, is coated with silver ink by means of relief printing so as to form a film shape and make a silver paper with metal effect. The silver ink contains scaly metal powder made of aluminum. The diameter of the particles in the aluminum powder in the above ink is about 2 μm~50 μm, preferably less than or equal to 20 μm. Further, the thickness of one piece of the above metal powder is preferably less than or equal to 50 nm. The silver paper is used as a substrate, on which design printing for decoration is implemented in a manner of offset printing. Next, various decorations are implemented through foil pressing or screen printing. Then, a paper lamination machine is used to laminate the paper. Demoulding and other processing are then implemented so as to make the metal decorative product in the embodiments of the present disclosure. Also, in the process of the above-described coating of silver ink, one time brushing and two times brushing (overlapping brushing) are attempted.

Next, as a comparison example, a silver paper making use of the existing laminations is utilized to make aluminum foil product which serves as the metal decorative product.

Then, the metal decorative product in the embodiments of the present disclosure is compared with the aluminum foil product in the above comparative example. In a state that the metal decorative product is containing RFID tags in UFH band, the communication performance of the RFID is acknowledged. As a result, the RFID in the existing aluminum foil product as comparative example cannot perform communication. On the other hand, the communication performance of the RFID in the metal decorative product as recited in the embodiments of the present disclosure does not deteriorate, and can perform communication. Also, the results remain the same, either with one time brushing or two times brushing.

Further, the metal decorative product in the embodiments of the present disclosure is compared with the aluminum foil product in the above comparative example with respect to the metallic luster of appearance. The result is that both of them have the same metallic luster.

Next, a second embodiment of the present disclosure is illustrated with reference to FIG. 4.

Second Embodiment

Figure 4:
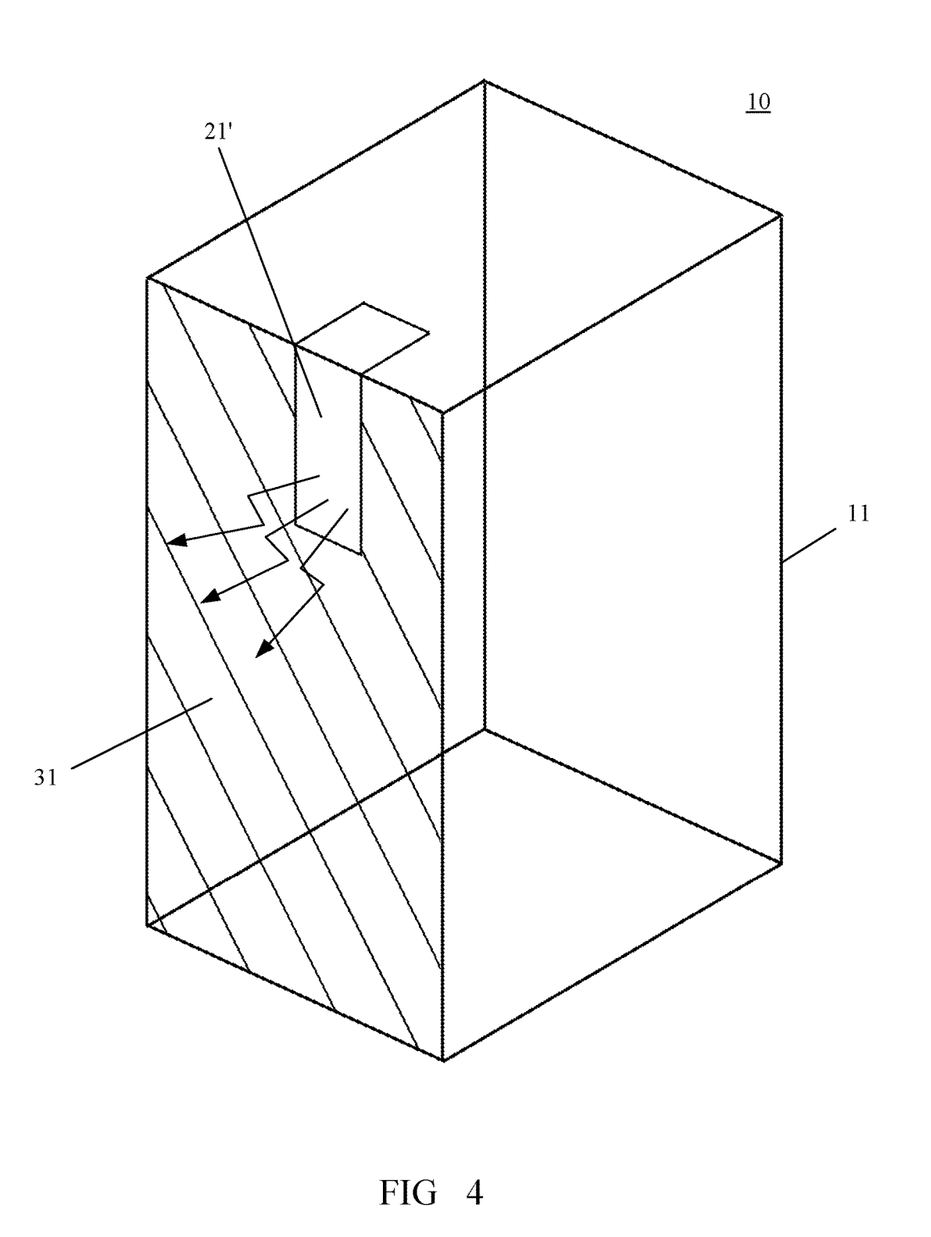
FIG. 4 is a schematic diagram for illustrating the structure of a metal decorative product involved in the second embodiment of the present disclosure.

FIG. 4 is a schematic diagram for illustrating the structure of the metal decorative product involved in a second embodiment. Similarly as described in FIG. 3, the metal decorative product 10 consists of a substrate 11 such as paper. A metallic luster decoration coated packaging 31 is formed on the surface of the substrate 11. A printing layer is formed on the metallic luster decoration coated packaging 31. Electromagnetic wave device 21' such as RFID tag and the like are adhered to the surface of the metallic luster decoration coated packaging 31, with the printing layer intervening.

In addition, the status of the ink forming the metallic luster decoration coated packaging 31 is the same as that described in the first embodiment, thus is omitted herein.

For example, in the situation that an electromagnetic wave device such as RFID tag etc. is attached to the surface of metal foil of a box, which is an existing metal decorative product, the electromagnetic wave generated by the RFID tag will cause eddy currents in the metal foil so that the electromagnetic wave device cannot perform communication.

On the other hand, in the metallic luster decoration coated packaging 31 of the metal decorative product 10 involved in the second embodiment, the metallic luster decoration coated packaging 31 is formed by coating an ink which is mixed with metal powder 1 and metal powder connection 3 formed by the metal powder 1. With ink 2, the metal powder 1 and the metal powder connection formed by the metal powder 1 are insulated and independent from each other so as to inhibit the generation of eddy currents in the metallic luster decoration coated packaging 31. Thus, as shown by the arrow in FIG. 4, even if the electromagnetic wave device 21' such as RFID tags are attached to the surface of the metallic luster decoration coated packaging 31, the electromagnetic wave generated by the electromagnetic wave device 21' can still be radiated out so that the electromagnetic wave device 21' can perform communication.

Although the first and second embodiments of the present disclosure are described above, various omissions, replacements and modifications can be made without departing from the scope of the idea of the present disclosure.

Further, in the first and second embodiments, while a wine bottle packaging, which is a box shaped product, is exemplified as an example of the metal decorative product of the present disclosure, the present disclosure is not limited to this but can also be applied to bag shaped products and laminated products. For example, as an example of the laminated product, there is "IC card" or "IC ticket", wherein a component such as RFID insert is laminated at both front side and back side using a sheet shaped substrate having a metallic luster decoration coated packaging.

Besides, in the first and second embodiments, printing methods such as stereoscopic printing, dot printing, etc. can be enumerated as a method of forming the metallic luster decoration coated packaging 31 on the surface of the substrate 11.

Besides, apart from "coated paper", "resin film" (such as PET, PVC, PE, PP, etc.) and "wood" can also be used as the substrate of the metal decorative product.

As an example of the structure that the metallic luster decoration coated packaging is formed on a substrate, for example, the metallic luster decoration coated packaging is formed in a manner of film coating on at least one side of a resin film which an extended polyethylene terephthalate (PET) resin film, an extended polypropylene (PP) resin film, an acrylic acid resin film, a cellulosic resin film, a vinyl chloride resin film, or other transparent film.

Further, the resin film which is an extended polyethylene terephthalate (PET) resin film, an extended polypropylene (PP) resin film, an acrylic acid resin film, a cellulosic resin film, a vinyl chloride resin film, or other transparent film can also be laminated with other substrates to form a composite substrate, and the metallic luster decoration coated packaging is formed in a manner of film coating on an outer surface of a film side of the laminated composite substrate, that is, on a surface of a side of the resin opposite to the side facing to said other substrate.

Further, the resin film which is an extended polyethylene terephthalate (PET) resin film, an extended polypropylene (PP) resin film, an acrylic acid resin film, a cellulosic resin film, a vinyl chloride resin film, or other transparent film can also be laminated with paper substrates to form a composite substrate, and the metallic luster decoration coated packaging is formed in a manner of film coating on an inner surface of a film side of the laminated composite substrate, that is, on a surface of a side of the resin facing to the paper substrate.

Further, in the first and second embodiments, the surface resistivity (surface resistance) of the coating is preferably greater than or equal to 100 Ω/sq in order to ensure the transmittance of the radio wave.

Further, FIGS. 1 and 4 show the situation where the metallic luster decoration coated packaging 31 is formed on the entire surface of the substrate 11, but it is not limited to this. The metallic luster decoration coated packaging 31 can also be formed on a portion of the surface of the substrate 11. Also, the metallic luster decoration coated packaging 31 can also be formed on the back of the substrate 11, or on both front side and back side of the substrate 11.

REFERENCE NUMERALS

1 Metal powder; 2 Ink; 3 Metal powder connection; 10, 100 Metal decorative product; 11, 101 Substrate; 20, 200 Part; 21, 21', 201 Electromagnetic wave device; 31, 301 Metallic luster decoration coated packaging;

What is claimed is:

1. A metal decorative product, comprising:
a metallic luster decoration coated packaging on at least one side of a substrate and enclosing a part with an electromagnetic wave device, wherein:
the metallic luster decoration coated packaging is formed by coating an ink mixed with metal powder, and,
the ink used to make the metal powder and metal powder connection formed by the metal powder are insulated and independent from each other.

2. The metal decorative product of claim 1, wherein,
an electrical length constituted by the metal powder and the metal powder connection is less than or equal to 5 mm.

3. The metal decorative product of claim 1, wherein,
the metallic luster decoration coated packaging is formed through stereoscopic printing.

4. The metal decorative product of claim 1, wherein,
the metallic luster decoration coated packaging is formed through dot printing.

5. The metal decorative product of claim 1, wherein the substrate comprises a resin film.

6. The metal decorative product of claim 5, wherein,
the resin film is an extended polyethylene terephthalate resin film, an extended polypropylene resin film, an acrylic acid resin film, a cellulosic resin film, a vinyl chloride resin film, or other transparent film,
the metallic luster decoration coated packaging is formed on at least one side of the resin film by film coating.

7. The metal decorative product of claim 5, wherein,
the resin film is an extended polyethylene terephthalate resin film, an extended polypropylene resin film, an acrylic acid resin film, a cellulosic resin film, a vinyl chloride resin film, or other transparent film,
the substrate is a composite substrate formed by laminating the resin film with other substrates,
the metallic luster decoration coated packaging is formed by film coating on an outer surface of a resin film side of the composite substrate.

8. The metal decorative product of claim 5, wherein,
the resin film is an extended polyethylene terephthalate resin film, an extended polypropylene resin film, an acrylic acid resin film, a cellulosic resin film, a vinyl chloride resin film, or other transparent film,
the substrate is a composite substrate formed by laminating the resin film with a paper substrate,
the metallic luster decoration coated packaging is formed by film coating on an inner surface of a resin film side of the composite substrate.

9. The metal decorative product of claim 1, wherein,
the substrate is a coated paper,
the metallic luster decoration coated packaging is formed on a coating surface of the coated paper by film coating.

10. The metal decorative product of claim 1, wherein,
the metal powder is aluminum pigment with a particle diameter less than or equal to 20 μm and a single piece thickness less than or equal to 50 nm.

11. The metal decorative product of claim 1, wherein,
the surface resistivity of the metallic luster decoration coated packaging is greater than or equal to 10 Ω/sq.

12. The metal decorative product of claim 1, wherein the metallic decorative product is a box shaped product.

13. The metal decorative product of claim 1, wherein the metallic decorative product is a bag shaped product.

14. The metal decorative product of claim 1, wherein the metallic decorative product is a laminated product.

15. A metal decorative product, comprising:
a metallic luster decoration coated packaging on at least one side of a substrate, and,
an electromagnetic wave device is attached to a surface of the metallic luster decoration coated packaging, wherein:
the metallic luster decoration coated packaging is formed by coating an ink mixed with metal powder,
the ink used to make the metal powder and metal powder connection formed by the metal powder are insulated and independent from each other.

16. The metal decorative product of claim 15, wherein,
an electrical length constituted by the metal powder and the metal powder connection is less than or equal to 5 mm.

17. The metal decorative product of claim 15, wherein,
the metallic luster decoration coated packaging is formed through stereoscopic printing.

18. The metal decorative product of claim 15, wherein,
the metallic luster decoration coated packaging is formed through dot printing.

19. The metal decorative product of claim 15, wherein the substrate comprises a resin film.

20. The metal decorative product of claim 19, wherein,
the resin film is an extended polyethylene terephthalate resin film, an extended polypropylene resin film, an acrylic acid resin film, a cellulosic resin film, a vinyl chloride resin film, or other transparent film,
the metallic luster decoration coated packaging is formed on at least one side of the resin film by film coating.

21. The metal decorative product of claim 19, wherein,
the resin film is an extended polyethylene terephthalate resin film, an extended polypropylene resin film, an acrylic acid resin film, a cellulosic resin film, a vinyl chloride resin film, or other transparent film,
the substrate is a composite substrate formed by laminating the resin film with other substrates,
the metallic luster decoration coated packaging is formed by film coating on an outer surface of a resin film side of the composite substrate.

22. The metal decorative product of claim 19, wherein,
the resin film is an extended polyethylene terephthalate resin film, an extended polypropylene resin film, an acrylic acid resin film, a cellulosic resin film, a vinyl chloride resin film, or other transparent film,
the substrate is a composite substrate formed by laminating the resin film with a paper substrate,
the metallic luster decoration coated packaging is formed by film coating on an inner surface of a resin film side of the composite substrate.

23. The metal decorative product of claim 19, wherein,
the substrate is a coated paper,
the metallic luster decoration coated packaging is formed on a coating surface of the coated paper by film coating.

24. The metal decorative product of claim 15, wherein,
the metal powder is aluminum pigment with a particle diameter less than or equal to 20 μm and a single piece thickness less than or equal to 50 nm.

25. The metal decorative product of claim 15, wherein,
the surface resistivity of the metallic luster decoration coated packaging is greater than or equal to 10 Ω/sq.

26. The metal decorative product of claim 15, wherein the metallic decorative product is a box shaped product.

27. The metal decorative product of claim 15, wherein the metallic decorative product is a bag shaped product.

28. The metal decorative product of claim 15, wherein the metallic decorative product is a laminated product.

\* \* \* \* \*